April 23, 1968

E. N. MARTIN ETAL 3,379,116

BEVERAGE OR FOOD DISPENSER

Filed May 31, 1966

ERNEST N. MARTIN
DARWIN B. MAXSON
JOSEPH F. SCHEFFER
INVENTORS.

BY Paul A. Weilein

ATTORNEY

April 23, 1968   E. N. MARTIN ETAL   3,379,116
BEVERAGE OR FOOD DISPENSER
Filed May 31, 1966   3 Sheets-Sheet 2

ERNEST N. MARTIN
DARWIN B. MAXSON
JOSEPH F. SCHEFFER
INVENTORS

BY Paul A. Weilein
ATTORNEY

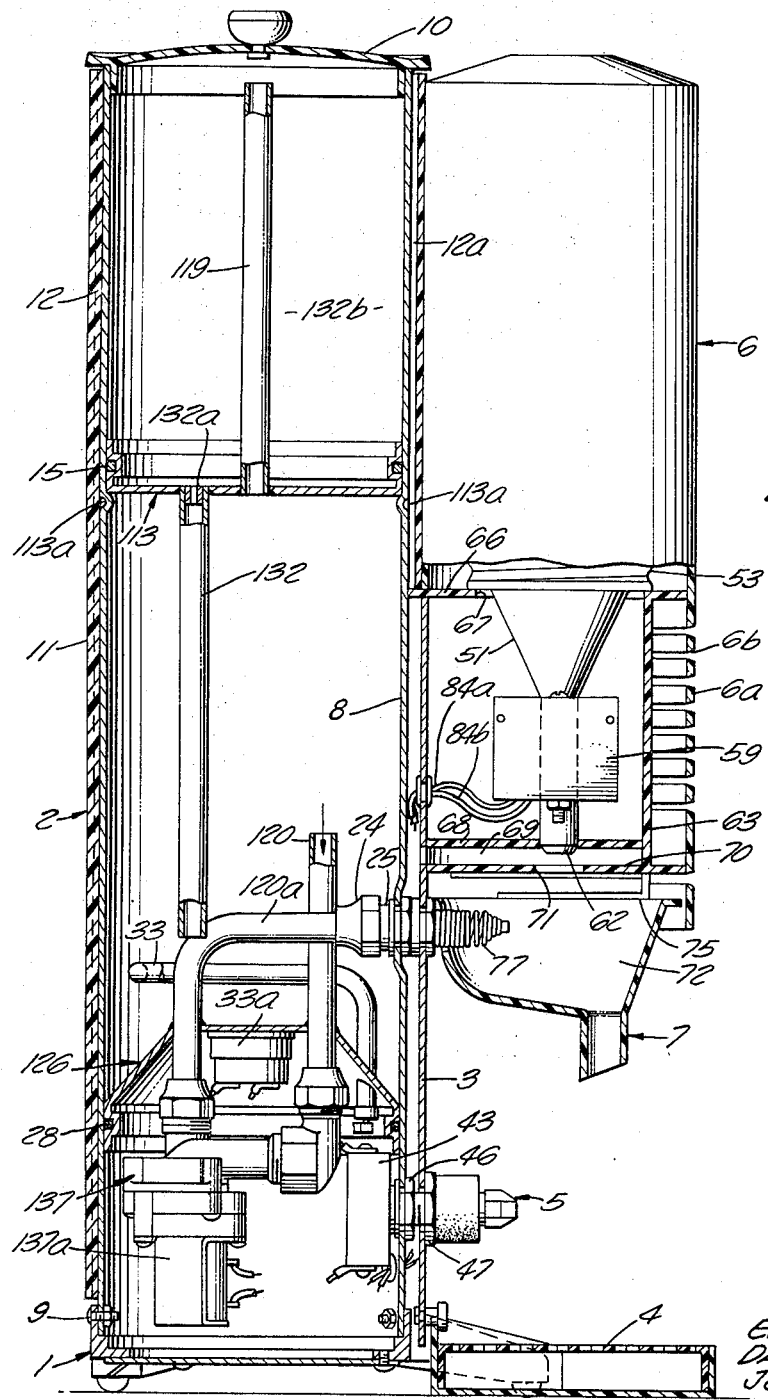

United States Patent Office 3,379,116
Patented Apr. 23, 1968

3,379,116
BEVERAGE OR FOOD DISPENSER
Ernest N. Martin, Escondido, Darwin B. Maxson, Downey, and Joseph F. Scheffer, Covina, Calif., assignors to Columware, Inc., Lynwood, Calif., a corporation of California
Filed May 31, 1966, Ser. No. 554,192
37 Claims. (Cl. 99—275)

ABSTRACT OF THE DISCLOSURE

An upright tank for heating water serves as a support for a container of powdered material on one side of the tank and a mixing chamber below the container, the mixing chamber having a dispensing spout to deliver the mixed beverage to a cup. When a cup is pushed against a switch at the bottom of the tank, the tank delivers hot water to the mixing chamber and, after a time delay, powdered material is delivered to the mixing chamber from the container, the mixed beverage being then discharged into the cup. The upright tank has a cover, an upper head spaced below the cover to form therewith an upper compartment, and a lower head spaced below the upper head to form therewith a water heating chamber and also to form a lower compartment below the water heating chamber. The cover and both the upper head and the lower head are removable to facilitate cleaning of the entire interior of the tank and the components therein.

---

Figure 1:
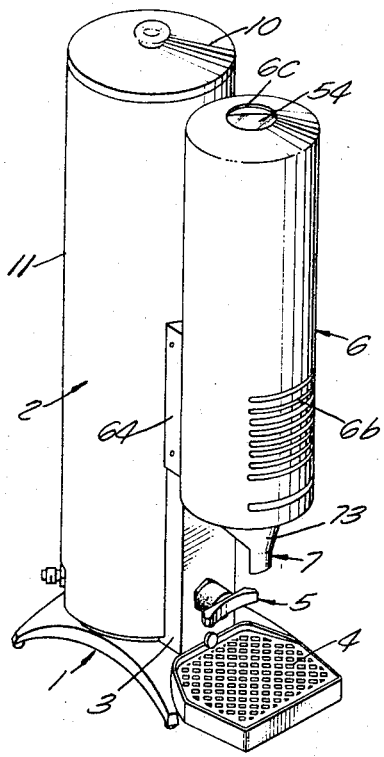

The present invention relates to beverage dispensers and more particularly to improvements in beverage dispensers which may be employed for the purpose of dispensing measured quantities of beverage, for example, cups of coffee or other beverage by mixing with a measured amount of hot water soluble material, the water and dissolved material being discharged into a cup or other receptacle. While coffee has been specifically referred to above, it will be understood that the beverage may be other than coffee including, for example, tea, hot chocolate, soup, or any beverage or liquid food which is prepared by mixing a soluble powder with water.

It is a common problem with water heaters employed in connection with beverage dispensing apparatus that periodically they must be cleaned internally to eliminate scale, calcium carbonate, or other deposits which accumulate within the heater over a period of time and which have a deleterious effect on the flavor of the resultant beverage. Heretofore, it has been necessary to resort to rather expensive cleaning operations involving the circulation through the system of suitable acid for the purpose of dissolving the deposited scale and carbonates. Such cleaning operations are required at more or less frequent intervals depending upon the mineral content of the water supply. Accordingly, among the objects of the present invention is the provision of a beverage dispensing apparatus including a water heater which may be readily disassembled for purposes of enabling rapid and efficient cleaning.

Another problem which is encountered in the mixing of hot water and soluble powder in the preparation of beverages by apparatus of the general class here involved is that moisture from the hot water contacting the soluble powder moistens the powder, thereby impeding accurate dispensing of measured quantities of the powder with the derivative result that the apparatus does not function to dispense beverage of uniform quality. Moistening of the powder, moreover, cases it to build up deposits in the dispensing apparatus which must be cleaned to enable the apparatus to properly function.

Accordingly, another object of the invention is the provision of a beverage dispenser having a water heater and dispenser mechanism so related to one another that heated or dry air is caused to flow past the outlet of the dispenser mechanism and along with the soluble powder into the region where it is to be mixed with the hot water. Such flow of warm air not only serves to keep the powder dry, but also tends to preclude the contact of moisture with the dispensing apparatus in the vicinity of its outlet. From the standpoints of simplicity and safety, it is desirable in connection with apparatus of the type here involved that the water tank construction be simple to manufacture and therefore comparatively inexpensive, but that the outer wall of the water heater be sufficiently cool during use that a user may not be inadvertently burned. Hence, another object of the invention is to provide a simple water heater construction which need not be provided with insulating material to maintain a cool outer surface and wherein an ornamental and heat insulating outer sleeve is disposed about the otherwise uninsulated hot water heater to define an air space therebetween through which air may flow, entering the lower end of the sleeve and passing upwardly between the outer wall of the hot water tank and the inner wall of the sleeve so as to dissipate heat whereby the outer sleeve will remain sufficiently cool as to avoid burning the user.

Other objects and advantages of the invention will be hereinafter described or will become apparent to those skilled in the art, and the novel features of the invention will be defined in the appended claims.

Figure 5:
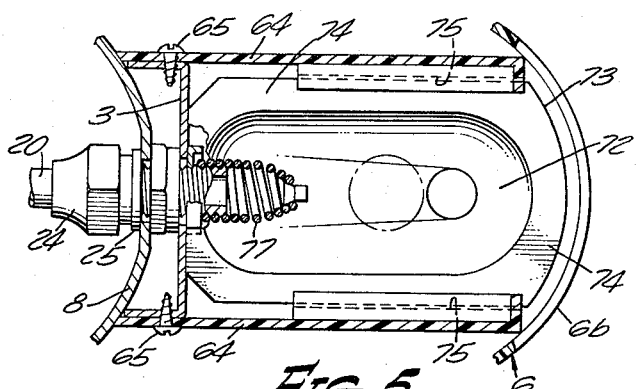
Figure 4:
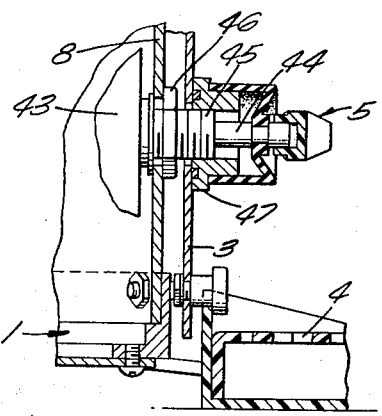
Figure 3:
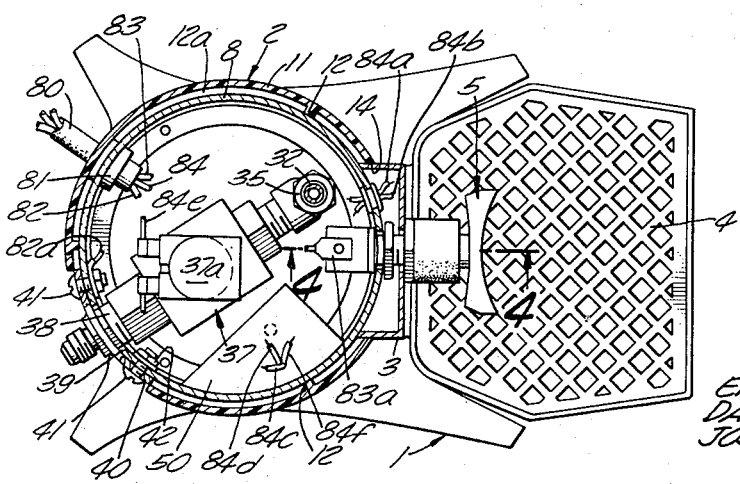
Figure 2:
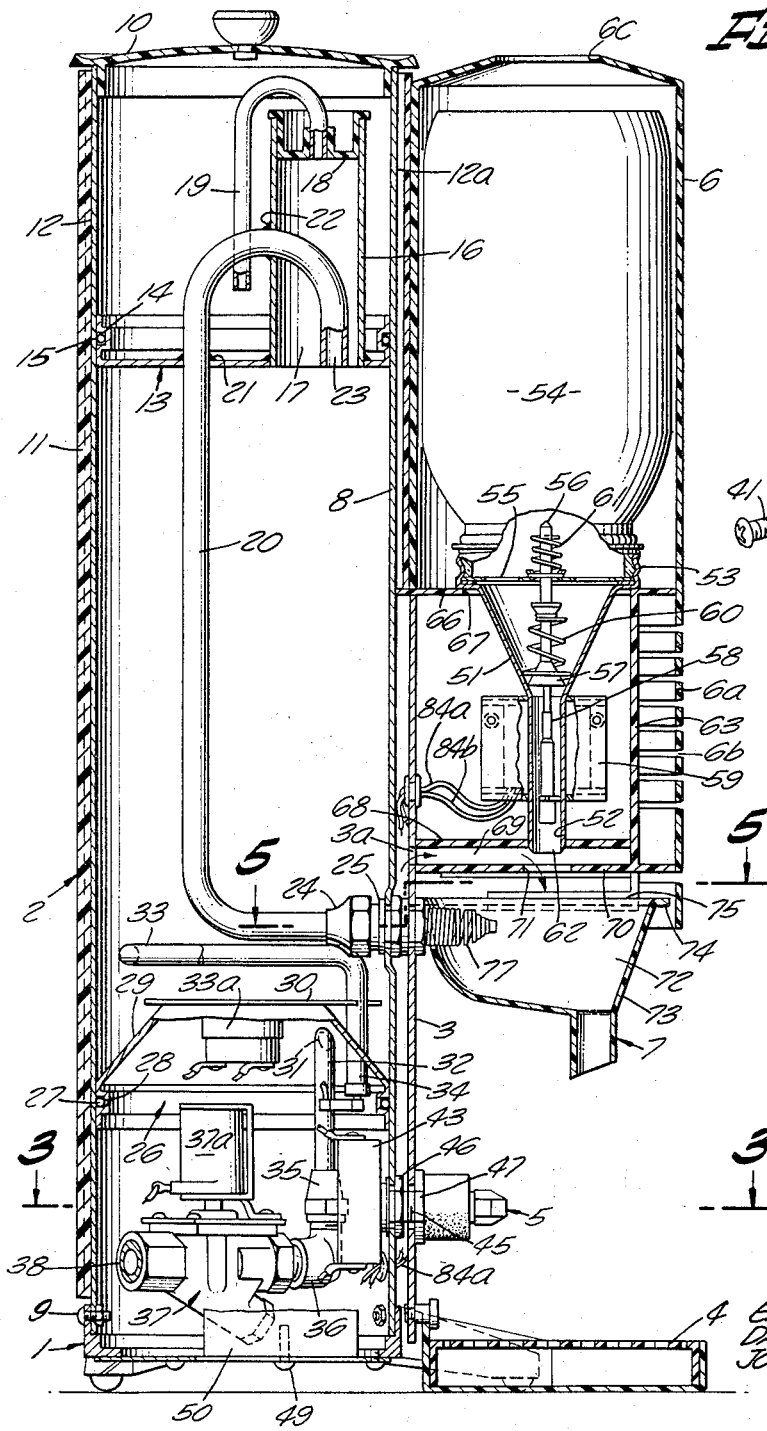
Figure 6:
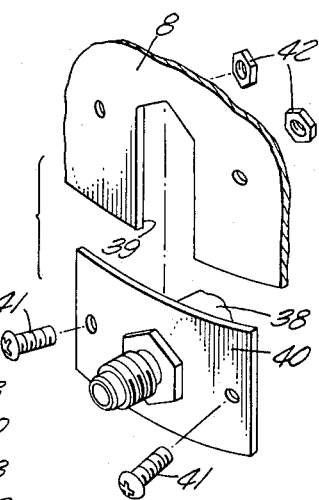

In the accompanying drawings:
FIG. 1 is a perspective view illustrating a beverage dispenser made in accordance with the invention;
FIG. 2 is a vertical sectional view taken on a plane extending from front to rear of the dispenser of FIG. 1 and bisecting the same, certain of the parts being shown in elevation;
FIG. 3 is a horizontal sectional view as taken on the line 3—3 of FIG. 2;
FIG. 4 is a fragmentary view in vertical section as taken on the line 4—4 of FIG. 3;
FIG. 5 is a fragmentary horizontal section as taken on the line 5—5 of FIG. 2;
FIG. 6 is an exploded detail view in perspective illustrating the means for removably securing within the lower portion of the housing the filling valve for the water heater of the invention; and
FIG. 7 is a view generally corresponding to FIG. 2 and illustrating another embodiment of the invention.

Like reference characters in the several views of the drawings and in the following description designate corresponding parts.

Referring first to FIG. 1, the beverage dispenser of the invention is illustrated as comprising a base 1 on which is disposed a water heater assembly 2. Along the front wall of the heater assembly 2 is a channel member 3 which, as will hereinafter be described, provides a heat stack. Adjacent the base 1 and disposed forwardly of the channel member is a tray 4 adapted to receive a beverage receptacle such as a cup in a position whereby the receptacle may be employed to actuate a switch 5 to initiate operation of a dispenser mechanism enclosed within a housing 6 and having a discharge spout 7 through which the beverage will be dispensed into the above mentioned receptacle.

Referring now more particularly to FIG. 2, it will be noted that the water heater assembly 2 comprises a tubular shell 8 to the lower extremity of which the base 1 is removably secured by fasteners 9. At the upper end of the shell 8 is a suitable closure 10.

In accordance with one of the objectives of the invention, the shell 8 is illustrated as being shrouded by an ornamental and heat insulating outer sleeve 11 adapted to be slip fit over the upper end of the shell 8 when the closure 10 is removed. Within the shell 8 is a suitable number of circumferentially spaced ribs or other centralizing spacers 12, as best seen in FIG. 3, whereby an air space 12a is provided between the shell 8 and the sleeve 11. As is also shown in FIG. 3, the sleeve 11 is longitudinally slotted at 14 so as to closely fit with the channel member 3 secured to the front of the shell 8 in a manner hereinafter to be more fully described. The sleeve 11 is open at its lower end whereby air is free to enter the lower end of the above noted air space 12a, and due to the heating of the air by the water tank, such air will flow upwardly through the air space 12a and will pass between the upper end of sleeve 11 and the closure 10 between which there is a loose fit.

Within the shell 8 of the water heater assembly and adjacent the upper end thereof is an upper head 13 having a peripheral channel 14 in which is disposed an O-ring 15 for effecting a seal between the head and the shell 8. The head 13 is provided with an upwardly extended expansion tube 16 having an opening 17 leading through the head and having a closure 18 adapted to tightly fit in the tube 16 at the upper end of the latter, the tube thereby forming an expansion chamber for purposes which will hereinafter appear. The closure 18 has a vent tube 19 leading into the expansion chamber and having a free end recurved so as to extend downwardly alongside the tube 16.

Extending through the head 13 is a water discharge tube 20 connected as by welding at 21 to the head 13. At its upper end the water discharge tube extends into the expansion tube 16 and is connected to the latter as by a weld 22, with the extremity of the tube 20 bent downwardly and having an end opening 23 opening on a plane coincident with the bottom of the head 13 and the lower end of the expansion tube 16, thus providing siphon means for causing the flow of heated water through said tube 20 as water enters the chamber between the heads 13 and 26. At its lower end the water discharge tube 20 is directed laterally and is provided with a suitable coupling 24 for connection with a fitting 25 which is mounted in the wall of the shell 8.

It will now be apparent that the head 13 is supported in the shell 8 by the water discharge tube 20 so that upon disconnection of the coupling from the fitting 25 the head 13 together with the discharge tube 20 and the other components including the expansion tube 16 and the vent 19 may be readily removed from the upper end of the shell 8.

Disposed within the lower portion of the shell 8 is a lower head assembly 26 having a marginal groove 27 in which is an O-ring 28 for effecting a seal between the head 26 and the shell 8. This head 26 has a frusto-conical section 29 at the upper end of which is a baffle 30 which projects outwardly in overlying relation to the divergent wall of the section 29. Beneath the baffle 30 is an inlet 31 for admitting water into the shell between the upper head 13 and the lower head 26 supplied through a water supply tube 32. Extending into the shell 8 through the lower head 26 is also an electric heating element 33 of the looped type having its terminals projecting through the conical section 29 of the head 26 as indicated at 34.

The lower end of the water supply tube 32 is connected by a connector 35 to an outlet fitting 36 of a valve assembly 37. This valve assembly has an inlet connection 38 which, as seen in FIGS. 3 and 6, extends through an elongated downwardly opening slot 39 in the wall of shell 8. Externally of the shell 8, the inlet fitting 38 supports an attachment plate 40 which is adapted to be secured to the shell 8 by fastener means illustratively comprising screws 41 and nuts 42.

It will now be apparent from the foregoing that the head assembly 26 is integrated with the valve asembly 37 by means of the water supply tube 32 and the latter is connected to the shell 8 so that effectively the lower head 26 and the valve assembly are removable from the lower end of the shell 8 as a unitized subassembly upon removal of fastener screws 41 and upon downward movement of the valve inlet connection 38 through the open end of slot 39 in the shell 8.

Mounted within the shell 8 beneath the head 26 is a switch 43 having, as best seen in FIG. 4, actuator means 44 reciprocal in a supporting connector 45 which is secured to the shell 8 by a nut 46. The connector 45 also projects through the above described channel member 3 and a nut 47 threaded on the connector 45 partially serves to support the channel member 3 on the shell 8. The switch actuator means 44 includes the operator member 5 previously referred to and disposed above the tray 4 in a location so that the member 5 is adapted to be engaged by a receptacle such as a cup as it is being placed on the tray 4 so as to cause actuation of the switch 43.

Also disposed within the shell 8 beneath the lower head 26 and preferably mounted upon the base 1 as by a fastener 49 so as to be removable from the shell 8 with the base 1, is a delay timer 50 which, as will hereinafter appear, functions to control operation of the dispensing mechanism shown particularly in FIG. 2. This dispenser mechanism is more particularly the subject matter of U.S. Patent No. 3,204,832, granted Sept. 7, 1965, to S. Morgan Barber to which reference may be had.

In essence, the dispenser mechanism comprises a downwardly extended conical member 51 providing a downwardly sloping chamber terminating in an elongated discharge tube having a passage 52, the member 51 being provided with a threaded upper end 53 adapted to engage a typical material receptacle such as a jar 54 containing powdered material to be mixed with the hot water to provide a beverage. The dispenser means further includes a resilient spider-like member 55 disposed across the outlet of the container 54 and which centralizes the upper end of a valve stem. This valve stem has thereon a head 57 adapted to normally close the flow passage 52. Beneath the valve 57 on the stem 56 is a magnet core 58 adapted to be reciprocated by a solenoid coil 59 to unseat the valve head 57. The valve stem will be caused to oscillate under the influence of the solenoid and a coiled spring 60 acting downwardly on the valve. A spring connection as at 61 is made between the upper end of the valve stem 56 and the spider 55 whereby the latter will be flexed to cause agitation of the powdered material at it passes downwardly from the container 54 through the passage 52 during oscillation of the valve head 57. At its lower extremity the dispenser apparatus has an outlet 62 through which the powdered material will be dispensed.

The supporting structure for the removable dispenser mechanism comprises a box-like support 63 having side walls 64, the inner portions of which, as shown in FIG. 5, are connected as by fasteners 65 to the vertical sides of the channel member 3. The box-like support 63 has an upper wall 66 provided with an opening 67 adapted to receive the conical section 51 of the dispenser apparatus with the portion 53 at the upper end of the latter removably resting on the upper wall 66 and with the downward extension of the conical member 51 disposed within the solenoid 59. The housing 6 which shrouds the dispenser mechanism fits over the container or jar 54 as seen in FIG. 2, and has a skirt portion 6a provided with perforations 6b and an upper opening 6c for enabling ventilation of the same. The lower end of the dispenser apparatus and more particularly the outlet end 62 extends through a wall 68 of the box-like support 63 into a horizontally extended space 69 provided by the bottom wall 70 of the box-like support 63. It will be noted that the channel member 3 in alignment with the space 69 has an opening 3a so that the space defined between the shell 8 and the channel member 3 communicates through the opening 3a with the space 69 between walls 68 and 70 of the box-like support 63. Beneath the discharge end 62 of the dispensing apparatus in the wall 70 is an opening 71 through which dispensed material will pass into a mixing chamber 72.

This mixing chamber is defined by a member 73 having an upper peripheral flange 74 adapted to be removably received in opposing channels 75 formed between inwardly extended flanges (FIG. 5) of the side walls 64 which project below the bottom wall 70 of the box-like member 63. The member 73 has the previously described discharge spout 7 through which mixed water and soluble material will be dispensed, the water being admitted to the mixing chamber 72 through the water discharge fitting 25 and the latter preferably being provided with a suitable diffuser 77 whereby water will be diffused about the mixing chamber to effectively wash the same and enhance mixing with the dispensed powdered material.

In order to prevent the powdered material being dispensed from the discharge outlet 62 of the dispensing apparatus from being moistened due to the proximity of the dispensing outlet to the mixing chamber 72, it will be recognized that the channel member 3 effectively constitutes a heat stack extending vertically alongside the shell 8 so that air within the channel member 3 will be heated by conduction from inside the shell 8 and thereby caused to circulate, as shown by the arrows, upwardly through the channel member 3 through opening 3a into the space 69 and thence downwardly through the opening 71 into the mixing chamber around the dispensing outlet 62. Such flow of hot air not only will keep the powder dry as it is being dispensed, but will also prevent the accumulation of moisture on the discharge outlet of the dispensing mechanism. Thus, the necessity for cleaning the dispensing mechanism is reduced and dispensing efficiency is improved.

Referring now to FIG. 3, it will be noted that an electrical conductor cable 80 leads through the shell 8 at the lower en dthereof and is supported in the shell 8 by a grommet 81. This grommet, as well as the switch 43 previously described, are obviously removable from the shell 8 to allow downward removal of the lower head 26 after the base 1 has been removed.

The cable 80 is provided with three conductor wires. As will be obvious, one of the conductor wires 82 constitutes a ground adapted to be connected to a ground clip 82a secured to the shell 8. The cable includes another conductor 83 adapted to be connected to a switch terminal 83a. The cable also includes a thrid conductor 84 adapted to be connected to a lead 84a going to the solenoid 59 for the dispenser apparatus. The other side of this solenoid circuit includes a conductor 84b which is connected to the delay timer 50 as at 84c. These conductors 84a and 84b preferably extend through the space between the shell 8 and the channel member 3 as seen in FIG. 2. In addition, cable conductor 84 is directly connected as at 84d to the delay timer 50. Likewise, the conductor 84 is connected as at 84e to one side of the valve solenoid 37a. The other side of the valve solenoid, as will be obvious, will be connected to the switch 43 in series with a lead 84f for the delay timer 50. It will also be apparent that either of conductors 83 and 84 together with conductor 82 will be connected to the heating element 33 and a regulatory thermostat 33a mounted within the lower head 26 to limit the heating of water within the tank.

It is believed unnecessary to describe or show in greater detail the circuitry whereby the apparatus of the invention will be rendered operative upon actuation of the switch 43 whereby to accomplish the following mode of operation.

When it is desired that a quantity of beverage be dispensed, a receptacle will be placed upon the tray 4 in engagement with the switch actuator 5, depression of which will simultaneously energize valve solenoid 37a so as to open the inlet valve 37 and the delay timer 50. As a result of opening of the valve 37, water will be caused to flow into the heating chamber between heads 13 and 27 until the level in the expansion chamber rises above the upper extent of the water discharge tube 20, at which time, due to the siphoning action, water will flow through the inlet 23 of the discharge tube and upwardly around the upper bend in the latter and downwardly through the tube to the outlet in the mixing chamber 72. The delay timer 50 will serve to momentarily delay energization of the dispenser solenoid 59 so that such flow of water may begin before the dispenser solenoid 59 has been energized to cause reciprocation of the dispenser valve head 57. As the latter becomes energized it will cause during the period of its energization the dispensing from the container 54 of a uniform quantity of the powder per unit time so that uniform quantities of the powder may be mixed with the water as it is being dispensed. The powder will pass from the discharge outlet 62 of the dispenser mechanism through opening 71 along with the heated air flowing therethrough into the mixing chamber where it will be mixed with the water and discharged through the spout 7 into the cup or other receptacle on the tray 4. Just before the cup or other receptacle is full, the switch acuator 5 should be released to discontinue energization of the inlet valve solenoid and the dispensing solenoid and for a further short period of time the volume of water in the expansion tube 16 and in the water discharge tube 20 will continue to flow to wash the mixing chamber until the siphoning action is interrupted due to lowering of the water level below the plane of the inlet opening 23 of the water discharge tube.

Referring now to FIG. 7, the dispensing apparatus in accordance with another embodiment of the invention during the dispensing of a beverage from the hot water tank is adapted to receive a supply of water from a reservoir disposed above the chamber defined between the upper and lower heads, and the discharge of heated water is under the control of a solenoid operated outlet valve.

More specifically, in FIG. 7, the assembly is esentially the same in respect of the dispensing mechanism enclosed within the housing 6 and in respect of the construction of the shell 8 and the insulating sleeve 11, the tray 4 and the switch 43 and its actuator means 5 and, therefore, the same reference numerals are employed. However, in FIG. 7 the upper head is designated at 113 and the lower head is designated at 126, and as in the previously described embodiment these heads are respectively sealed within the shell by means of O-rings 15 and 28.

Referring to the upper head 113 it is provided with an upwardly extended vent tube 119 which communicates with the hot water chamber between the heads and a downwardly extended inlet or water supply tube 132 which projects downwardly and has its lower end opening adjacent the lower head 126 and preferably in the vicinity of the electric heating element 33. Within the upper end of the water supply tube 132 is a flow restrictor or orifice member 132a which, as will be hereinafter described, retards the flow of water from the supply reservoir 132b through the supply tube 132. The lower head assembly 126, as in the first described embodiment, supports the electric heating element 33. In addition, the head 126 supports a water discharge valve 137 operable by a solenoid 137a. The valve 137 has its inlet connected to an upstanding water discharge tube 120 which communicates with the water in the heating chamber at a level above the heating element 33 and thereby defines a minimum water level within the heating chamber so as to protect the same against overheating.

The discharge side of the valve 137 is connected by a tube 120a to the water discharge fitting 25 corresponding to that of the first described embodiment by means of the coupling 24. It will now be apparent that as in the case of the first described embodiment, the lower head 126 is removable from the lower end of shell 8 following removal of the base 1 and the switch 43 and disconnection of the coupling 24. Likewise, the upper head 113 may be removed from the upper end of the shell 8, downward movement of the head 113 in the shell 8 being limited by suitable means such as the provision of a number of angularly spaced dimples punched at 113a in the side walls of the shell 8.

As distinguished from the first described embodiment, the embodiment of FIG. 7 operates in the following manner responsive to the placement of a receptacle on tray 4 in engagement with switch actuator 5. When the switch 43 is closed by actuator 5, the solenoid 137a will be actuated and hot water will flow through the discharge tube 120 and the valve 137 as well as through discharge tube 120a so as to be discharged through the diffuser 77 into the mixing chamber 72 above the spout 7. Similarly, in an obvious manner the solenoid 59 of the dispensing mechanism will be energized upon actuation of switch 43 to commence operation of the dispenser mechanism as previously described. As water passes through the discharge valve from the heating chamber between the heads 113 and 126, the level of water within this chamber will be lowered at a rate faster than water can be supplied to the chamber through the orifice 132a from the reservoir 132b. When the switch actuator 5 is released, water will cease to flow into the mixing chamber and the dispenser mechanism will cease to dispense the soluble material but water will continue to transfer from the reservoir 132a through orifice member 132a to refill the the heating chamber.

Thus, it is apparent that the discharge head acting to cause flow through the discharge valve is the same no matter what may be the volume of reserve water in the reservoir 132b and thus the dispensing action will be constant with respect to each successive quantity of beverage mixed so long as water remains in the reservoir. An indication that the reservoir is depleted, therefore, will be the fact that the flow of water discharging through valve 137 will diminish somewhat with each successive use of the machine after the reservoir supply is depleted, but under no circumstances will the hot water in the tank fall below a level coincident with the plane of the inlet end of discharge tube 120.

While specific structural details have been shown and described, it should be understood that changes and alterations may be resorted to without departing from the spirit of the invention as defined in the appended claims.

We claim:

1. Apparatus for dispensing a beverage prepared by mixing with hot water a measured quantity of a water soluble material, said apparatus comprising: a water tank having a tubular shell provided with an upper head removably disposed in said shell in sealed engagement with said shell; a lower head removably disposed in said shell in sealed engagement with said shell; said heads defining therebetween a water heating chamber in said shell; means for supplying water to said heating chamber; means for heating the water in said chamber; means for discharging from said heating chamber a quantity of heated water; and means for mixing with said quantity of heated water a quantity of said water soluble material.

2. Apparatus as defined in claim 1, wherein said means for supplying water to said heating chamber comprises an inlet valve carried by said lower head, a supply tube leading from said valve through said lower head, and including means for removably connecting said inlet valve to said shell for supporting said lower head in said shell.

3. Apparatus as defined in claim 1, wherein said means for discharging from said chamber a quantity of heated water comprises a discharge fitting supported in said shell and leading to said means for mixing said heated water and water soluble material, a discharge tube connected to said fitting and extended upwardly in said shell and through said upper head, said discharge tube and said upper head having means for causing the flow of water from said chamber through said discharge tube as water is supplied to said heating chamber.

4. Apparatus as defined in claim 1, wherein said means for discharging from said chamber a quantity of heated water comprises a discharge fitting supported in said shell and leading to said means for mixing said heated water and water soluble material, a discharge tube extended upwardly in said shell from said fitting and through said upper head, said discharge tube and said upper head having means for causing the flow of water from said chamber through said discharge tube as water is supplied to said heating chamber, and including means releasably connecting said discharge tube to said fitting for supporting said upper head in said shell.

5. Apparatus as defined in claim 1, wherein said means for discharging from said chamber a quantity of heated water comprises a discharge fitting supported in said shell and leading to said means for mixing said heated water and water soluble material, a discharge tube connected to said fitting and extended upwardly in said shell and through said upper head, said discharge tube and said upper head having means for causing the flow of water from said chamber through said discharge tube as water is supplied to said heating chamber including an expansion chamber carried by said upper head and communicating with said chamber between said heads, said discharge tube having an end directed downwardly and having an end opening exposed in said chamber between said heads.

6. Apparatus as defined in claim 1, wherein said means for mixing with said quantity of heated water a quantity of said water soluble material comprises dispensing means, a mixing chamber below said dispensing means, and said means for discharging a quantity of heated water includes a discharge fitting leading into said mixing chamber.

7. Apparatus as defined in claim 1, wherein said means for mixing with said quantity of heated water a quantity of said water soluble material comprises dispensing means, a mixing chamber below said dispensing means, said means for discharging a quantity of heated water including a discharge fitting leading into said mixing chamber, and means for diffusing water passing from said fitting into said mixing chamber.

8. Apparatus as defined in claim 1, wherein said means for mixing with said quantity of heated water a quantity of said water soluble material comprises dispensing means, a mixing chamber below said dispensing means, said means for discharging a quantity of heated water including a discharge fitting leading into said mixing chamber, and including means for delaying the operation of said dispensing means momentarily following discharge of water from said heating chamber into said mixing chamber.

9. Apparatus as defined in claim 1, wherein said means for mixing with said quantity of heated water a quantity of said water soluble material comprises dispensing means, a mixing chamber below said dispensing means, said means for discharging a quantity of heated water including a discharge fitting leading into said mixing chamber, and including means for delaying the operation of said dispensing means momentarily following discharge of water from said heating chamber into said mixing chamber, and said means for discharging said water into said mixing chamber also including means for causing the further discharge of a quantity of said heated water following cessation of operation of said dispensing means.

10. Apparatus as defined in claim 1, wherein said means for mixing with said quantity of heated water a quantity of said water soluble material comprises electrically operated dispenser means, said means for discharging heated water comprising siphon means and a discharge fitting mounted in said shell, means providing a mixing chamber below said dispensing means and into which said discharge fitting extends, said means for supplying water to said heating chamber comprising an electrically operated valve, and means for energizing said valve and momentarily thereafter energizing said dispensing means.

11. Apparatus as defined in claim 1, wherein said means for supplying water to said heating chamber comprises a supply tube connected to said upper head and extending into said chamber.

12. Apparatus as defined in claim 1, wherein said means for supplying water to said heating chamber comprises a supply tube connected to said upper head and extending into said chamber, and said means for discharging heated water from said heating chamber comprising a discharge tube extending through said lower head into said heating chamber and having an inlet disposed above said heating means.

13. Apparatus as defined in claim 1, wherein said means for supplying water to said heating chamber comprises a supply tube connected to said upper head and extending into said chamber, said supply tube having an outlet adjacent to said lower head and said heating means being carried by said lower head in said heating chamber adjacent the outlet of said supply tube.

14. Apparatus as defined in claim 1, wherein said means for supplying water to said heating chamber comprises a supply tube connected to said upper head and extending into said chamber, and including a reservoir in said shell above said upper head, said supply tube having a restricted orifice for retarding flow of water from said reservoir through said supply tube into said heating chamber.

15. Apparatus as defined in claim 1, wherein said means for mixing with said quantity of heated water a quantity of said water soluble material comprises dispensing means, means defining a mixing chamber beneath said dispensing means, and said means for discharging heated water from said heating chamber includes a discharge fitting carried by said shell and projecting into said mixing chamber, a discharge tube leading from said heating chamber to said fitting, and valve means for controlling the discharge of water from said heating chamber through said discharge tube.

16. Apparatus as defined in claim 1, wherein said means for mixing with said quantity of heated water a quantity of said water soluble material comprises dispensing means, means defining a mixing chamber beneath said dispensing means, and said means for discharging heated water from said heating chamber includes a discharge fitting carried by said shell and projecting into said mixing chamber, a discharge tube leading from said heating chamber to said fitting, and valve means for controlling the discharge of water from said heating chamber through said discharge tube, and a diffuser on said fitting within said mixing chamber.

17. Apparatus as defined in claim 1, wherein said shell is provided with heat responsive means for causing air circulation over said shell for dissipating heat from said shell.

18. Apparatus as defined in claim 1, wherein said shell is provided with heat responsive means for dissipating heat from said shell, including a longitudinally extending sleeve disposed about said shell in spaced relation thereto, said sleeve being open at its lower end and extending along said shell to provide an air space therebetween through which air will flow responsive to the heat of said shell.

19. Apparatus as defined in claim 1, wherein said means for mixing with said quantity of heated water a quantity of said water soluble material includes a dispenser having a support for a container of said soluble material, means connectable to said container for dispensing therefrom said measured quantity of said material, a mixing chamber beneath said dispensing means, means for discharging heated water leading into said mixing chamber, heat stack means extending vertically along said shell from adjacent the bottom thereof and forming a channel, means above said mixing chamber forming a passage communicating with said heat stack means, said dispensing means having a discharge and extending into said passage, and said passage forming means having an opening beneath said discharge end leading into said mixing chamber for the flow of said measured quantity of material and air flowing into said passage from said heat stack means.

20. Apparatus as defined in claim 19, wherein said heat stack channel is supported on said shell and said dispenser is supported on said heat stack channel.

21. In a device of the character described for dispensing a beverage: an upright shell; a top wall spanning the upper end of the shell; an upper head inside the shell and spaced below said top wall to define therewith an upper compartment; a lower head inside the shell and spaced below said upper head to define therewith a water heating chamber, said top wall being in the form of a removable cover and said two heads being removably disposed inside the shell in sealing engagement with the shell, whereby the cover and two heads may be removed for cleaning and to expose the interior of the shell for cleaning; means for supplying water to said heating chamber; means for heating the water in said chamber; and means for discharging from said chamber a quantity of heated water.

22. A water tank having a tubular shell provided with an upper head removably disposed in said shell in sealed engagement with said shell; a lower head removably disposed in said shell in sealed engagement with said shell; said heads defining therebetween a water heating chamber in said shell; means for supplying water to said heating chamber; means for heating the water in said chamber; and means for discharging from said chamber a quantity of heated water, said means for supplying water to said heating chamber comprising: an inlet valve carried by said lower head, a supply tube leading from said valve through said lower head, and including means for removably connecting said inlet valve to said shell for supporting said lower head in said shell.

23. A water tank having a tubular shell provided with an upper head removably disposed in said shell in sealed engagement with said shell; a lower head removably disposed in said shell in sealed engagement with said shell; said heads defining therebetween a water heating chamber in said shell; means for supplying water to said heating chamber; means for heating the water in said chamber; and means for discharging from said chamber a quantity of heated water, said means for discharging from said chamber a quantity of heated water comprising: a discharge fitting supported in said shell, a discharge tube connected to said fitting and extended upwardly in said shell and through said upper head, said discharge tube and said upper head having means for causing the flow of water from said chamber through said discharge tube as water is supplied to said heating chamber.

24. A water tank having a tubular shell provided with an upper head removably disposed in said shell in sealed engagement with said shell; a lower head removably disposed in said shell in sealed engagement with said shell; said heads defining therebetween a water heating chamber in said shell; means for supplying water to said heating chamber; means for heating the water in said chamber; and means for discharging from said chamber a quantity of heated water, said means for discharging from said chamber a quantity of heated water comprising: a discharge fitting supported in said shell, a discharge tube extended upwardly in said shell from said fitting and through said upper head, said discharge tube and said upper head having means for causing the flow of water from said chamber through said discharge tube as water is supplied to said heating chamber, and including means releasably connecting said discharge tube to said fitting for supporting said upper head in said shell.

25. A water tank having a tubular shell provided with an upper head removably disposed in said shell in sealed engagement with said shell; a lower head removably disposed in said shell in sealed engagement with said shell; said heads defining therebetween a water heating chamber in said shell; means for supplying water to said heating chamber; means for heating the water in said chamber; and means for discharging from said chamber a quantity of heated water, said means for discharging from said chamber a quantity of heated water comprising: a discharge fitting supported in said shell, a discharge tube connected to said fitting and extended upwardly in said shell and through said upper head, said discharge tube and said upper head having means for causing the flow of water from said chamber through said discharge tube as water is supplied to said heating chamber including an expansion chamber carried by said upper head and communicating with said chamber between said heads, said discharge tube having an end directed downwardly and having an end opening exposed in said chamber between said heads.

26. A water tank having a tubular shell provided with an upper head removably disposed in said shell in sealed engagement with said shell; a lower head removably disposed in said shell in sealed engagement with said shell; said heads defining therebetween a water heating chamber in said shell; means for supplying water to said heating chamber; means for heating the water in said chamber; and means for discharging from said chamber a quantity of heated water, said means for supplying water to said heating chamber comprising: a supply tube connected to said upper head and extending into said chamber, and including a reservoir in said shell above said upper head, said supply tube having a restricted orifice for retarding flow of water from said reservoir through said supply tube into said heating chamber.

27. A water tank having a tubular shell provided with an upper head removably disposed in said shell in sealed engagement with said shell; a lower head removably disposed in said shell in sealed engagement with said shell; said heads defining therebetween a water heating chamber in said shell; means for supplying water to said heating chamber; means for heating the water in said chamber; and means for discharging from said chamber a quantity of heated water, said shell being provided with heat responsive means for dissipating heat from said shell, including a longitudinally extending sleeve disposed about said shell in spaced relation thereto, said sleeve being open at its lower end and extending along said shell to provide an air space therebetween through which air will flow responsive to the heat of said shell.

28. A combination as set forth in claim 21 which includes means for controlling the flow of water inside said shell, said control means including at least one component interconnecting one of said heads and the shell, said component being releasable from the shell to permit removal of said one head.

29. Apparatus as defined in claim 21, wherein said means for supply water to said heating chamber comprises a supply tube connected to said upper head and extending into said chamber.

30. Apparatus as defined in claim 21, wherein said means for supplying water to said heating chamber com-
prises a supply tube connected to said upper head and extending into said chamber, and said means for discharging heated water from said heating chamber comprising a discharge tube extending through said lower head into said heating chamber and having an inlet disposed above said heating means.

31. Apparatus as defined in claim 21, wherein said means for supplying water to said heating chamber comprises a supply tube connected to said upper head and extending into said chamber, said supply tube having an outlet adjacent to said lower head and said heating means being carried by said lower head in said heating chamber adjacent the outlet of said supply tube.

32. Apparatus for dispensing a beverage prepared by mixing with hot water a measured quantity of a water soluble material, said apparatus comprising: a water tank; heater means below said watertank; heat stack means extending vertically along the outside of said water tank from adjacent the bottom thereof and forming a channel; a dispenser including a support for a container of said soluble material; dispensing means connectable to said container for dispensing therefrom said measured quantity of said material; a mixing chamber beneath said dispensing means; water discharge means leading to said mixing chamber from said tank; means above said mixing chamber forming a passage communicating with said heat stack means; said dispensing means having a discharge end extending into said passage; and said passage forming means having an opening beneath said discharge end leading into said mixing chamber for the flow of said measured quantity of material and air flowing into said passage from said heat stack.

33. Apparatus as defined in claim 32, including means removably supporting said mixing chamber beneath said dispensing means.

34. Apparatus as defined in claim 32, wherein said heat stack channel is supported on said water tank and said dispenser support is mounted on said heat stack channel.

35. Apparatus as defined in claim 32, wherein said water discharge means comprises a fitting extending through said heat stack channel, and means removably connecting said channel to said fitting.

36. Apparatus as defined in claim 32, including means for actuating said dispensing means and said water discharge mean said water discharge means and said actuating means each including a fitting carried by said tank, and means removably connected to said fittings for mounting said heat stack channel on said tank.

37. Apparatus as defined in claim 32, including means disposed about said water tank for dissipating heat from the exterior surface of said tank including a sleeve disposed about said tank in spaced relation thereto for allowing circulation of air therebetween in response to heating of air within said space by said tank.

References Cited
UNITED STATES PATENTS

| | | | |
|---|---|---|---|
| 1,646,746 | 10/1927 | Carroll | 99—282 |
| 2,643,322 | 6/1953 | Lime | 99—282 |
| 2,898,843 | 8/1959 | Rockriver | 99—283 |
| 3,011,426 | 12/1961 | Mueller | 99—282 |
| 3,074,340 | 1/1963 | Walton | 99—283 |

ROBERT W. JENKINS, *Primary Examiner.*